United States Patent [19]

Horie et al.

[11] Patent Number: 5,238,083
[45] Date of Patent: Aug. 24, 1993

[54] ELECTRIC SOURCE APPARATUS OF ELECTRIC VEHICLE

[75] Inventors: Hideaki Horie; Masato Fukino; Namio Irie, all of Kanagawa, Japan

[73] Assignee: Nissan Motor Co., Ltd., Yokohama, Japan

[21] Appl. No.: 799,539

[22] Filed: Nov. 27, 1991

[30] Foreign Application Priority Data

Nov. 30, 1990 [JP] Japan .................................. 2-339378

[51] Int. Cl.$^5$ .............................................. B60L 3/00
[52] U.S. Cl. ............................ 180/274; 200/61.45 R; 180/65.1
[58] Field of Search ...................... 180/65.1, 65.8, 271, 180/274, 277, 279; 200/61.45 R; 105/50, 51

[56] References Cited

U.S. PATENT DOCUMENTS

| 3,743,849 | 7/1973 | Iwata | 180/279 |
| 4,000,408 | 12/1976 | McCartney | 180/279 |
| 4,058,182 | 11/1977 | Huber | 180/279 |

FOREIGN PATENT DOCUMENTS 61-202101 12/1986 Japan .
64-47501 3/1989 Japan .

Primary Examiner—Richard M. Camby
Attorney, Agent, or Firm—Pennie & Edmonds

[57] ABSTRACT

A switchable connection for a plurality of unit batteries for an electric vehicle. The unit batteries are normally connected in series through battery switches. When an impact sensor attached to a vehicle body detects an impact, a controller changes the battery switches to have a connecting state in which the unit batteries are separated into several groups.

14 Claims, 5 Drawing Sheets

ELECTRIC SOURCE APPARATUS OF ELECTRIC VEHICLE

BACKGROUND OF THE INVENTION

1. Field of the Invention

The present invention relates to improvements in an electric source apparatus for an electric vehicle, and more particularly to an electric source apparatus which improves vehicular weight without reducing the safety of vehicle passengers.

2. Description of the Prior Art

It is well known that electric vehicles are provided with a plurality of unit batteries as a drive electric source. The unit batteries are connected with a drive motor which drives the vehicle, an emergency switch which is operated in accordance with an impact detected by an impact sensor, and a main switch which is operated by a driver to start the electric vehicle. Such an electric vehicle is disclosed, for example, in Japanese Utility Model Provisional Publication Nos. 61-202101 and 64-47501. An electric source apparatus of the first listed prior art, JP-A-61-202101, is provided with an emergency switch which operates to cut the connection between the electric source (unit batteries) and a drive motor in the event that an impact sensor detects an impact in a vehicle collision or the like. An electric source apparatus of the other prior art, JP-A-64-47501, identified above is provided with a short circuit protecting device which includes a relay switch for cutting the connection between the electric source (unit batteries) and a drive motor.

However, with the above-mentioned conventional structure of the electric source apparatus, when the electric source is cut from the drive motor by the turning-off of the emergency switch and the like, the terminal voltage of the electric source remain at a high voltage similar to that in an operating condition. Accordingly, it is necessary to provide sufficient insulations for the electric source and high voltage circuit in order to protect vehicle passengers from receiving an electric shock. This insulation increases the vehicle weight and decreases the available travel distance of the vehicle.

SUMMARY OF THE INVENTION

It is an object of the present invention to provide an improved electric source apparatus which is free of the above mentioned drawbacks.

An electric source apparatus of an electric vehicle, in accordance with the present invention comprises a plurality of unit batteries which are in an electrically integral connection. Control means changes a connection of the unit batteries in accordance with an impact to a body of the electric vehicle.

With this arrangement, in the event of a serious collision or the like, the unit batteries are separated into several groups so as to protect vehicle passengers. This facilitates the insulation of the electric source apparatus, thereby decreasing the vehicle weight and improving the travel distance of the vehicle.

BRIEF DESCRIPTION OF THE DRAWINGS

In the drawings, like reference numerals designate corresponding elements and parts throughout all figures, in which.

DETAILED DESCRIPTION OF THE INVENTION

FIRST EMBODIMENT

Figure 1:
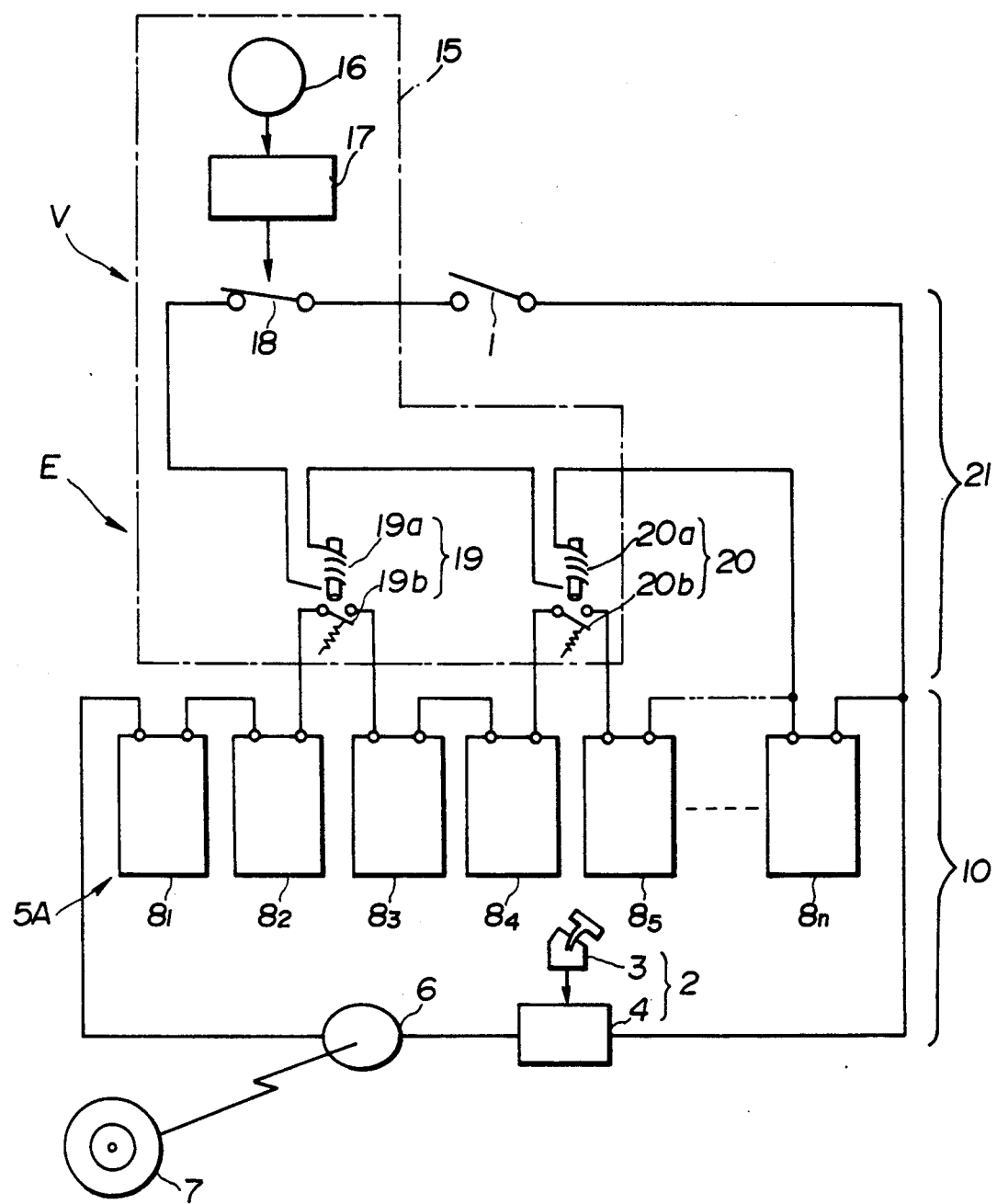
FIG. 1 is a block diagram of a first embodiment of an electric source apparatus of an electric vehicle in accordance with the present invention.

Referring now to FIG. 1, there is shown a first embodiment of an electric source apparatus E of an electric vehicle V in accordance with the present invention.

The electric source apparatus E comprises a main switch 1 which is used as an on-off switch, for a high voltage circuit 10. The high voltage circuit 10 comprises an electric source 5A for a drive system of the electric vehicle V and a drive motor 6. The main switch 1 is disposed at a proper position so that a driver in the electric vehicle V can conveniently operate it.

An acceleration device 2 includes an acceleration control section 3 which is disposed at a convenient location for the driver to control it and an electric current control section 4 for controlling the electric current amount which is supplied from the electric source 5A to the drive motor 6.

The electric source 5A comprises a plurality of unit batteries $8_1, 8_2, \ldots$ and $8_n$ which are connected in series. For example, twenty-five unit batteries, each of which has 12 V terminal voltage, are connected in series to output a high voltage electric power of 300 V (12 V×25=300 V). The electric source 5A is usually connected with various electric components of the electric vehicle V such as motors, a heater, a blower, an air-conditioner and lamps.

The drive motor 6 is driven by high voltage electric power from the electric source 5A, and drives drive wheels 7 which are connected to an output shaft of the drive motor 6.

A control means 15 includes an impact sensor 16, a calculating circuit 17, an in-circuit switch 18 and battery switches 19 and 20. The impact sensor 16, which is attached to a body of the electric vehicle V, detects an impact applied to the vehicle body and outputs an electric signal indicative of the detected impact value G. The calculating circuit 17 receives the signal indicative of the detected impact value G from the impact sensor 16 and compares the detected impact value G with a preset value Gs to determine if the detected impact value G is greater than or equal to the preset value Gs. When the detected impact value G is greater than or equal to the preset value Gs, the calculating circuit 17 outputs a signal indicative that the impact value G is greater than or equal to the preset value Gs. The in-circuit switch 18 is arranged to be turned off by an electromagnetic drive in accordance with the signal output from the calculating circuit 17. Each of the battery switches 19 and 20 includes each exciting coil 19a, 20a and each contact point 19b, 20b.

The unit battery $8_n$, the main switch 1, the in-circuit switch 18 and the exciting coil 19a, 20a are in a series connection to form a low-voltage circuit 21. The battery switch 19 connects the unit batteries $8_2$ and $8_3$ in series, and the battery switch 20 connects the unit batteries $8_4$ and $8_5$ in series. The electric source 5A, the drive motor 6, the current control section 4, and the contact point 19b, 20b of the battery switch 19, 20 are connected in series to form the high voltage circuit 10.

The manner of operation of the thus arranged electric source apparatus E will now be discussed.

When the electric vehicle V is in a packed condition and the the electric source apparatus E is set as shown in FIG. 1, that is, when the electric source apparatus E is in a condition that the main switch 1 is turned off, the in-circuit switch 18 is turned on, and each contact point of the battery switches 19 and 20 is turned off; the low voltage circuit 21 is set in a closed circuit in response to the switching of the main switch by the driver of the electric vehicle V. With this switching operation, the exciting current is flow from the unit battery $8_n$ to the exciting coils 19a and 20a so that the exciting coil 19a, 20a functions as an electromagnetic coil to turn on the contact point 19b, 20brespectively. Accordingly, the high voltage circuit 10 is set to a closed circuit so that high voltage electric power can be supplied from the drive electric source 5A to the drive motor 6. In this condition, when the driver operates the acceleration control section 3, the high voltage electric power, which is controlled in accordance with the control input by the driver, is supplied from the drive electric source 5A to the drive motor 6 to drive the drive motor 6. The drive wheels 7 are driven by the drive motor 6, and the electric vehicle V is driven at a desired speed in accordance with the control input of the acceleration control section 3.

In a driving condition of the electric vehicle V, when the impact, sensor 16 detects an impact such as the impact in a vehicle collision, the calculating circuit 17 compares the detected impact value G with the preset value Gs. When the detected impact value G is greater than or equal to the preset value Gs, the calculating circuit 17 stores the signal indicative of the judgement in the memory (not shown) of the calculating circuit 17. The calculating circuit 17 outputs the signal indicative of the stored data to the in-circuit switch 18 so as to place the in-circuit switch 18 in a turned off state. With the turning off operation of the in-circuit switch 18, the exciting current from the unit battery $8_n$ to the exciting coils 19a and 20a is cut in order to set the contact points 19b and 20b in a turned off state. This in turn causes the electrical connections between the unit batteries $8_2$ and $8_3$, and between the unit batteries $8_4$ and $8_5$ to be cut. The described cut-off action is partnered by each unit battery 8n, so that the connecting condition of twenty-five unit batteries $8_1$, $8_2$, . . . and $8_{25}$ is changed from a condition where all unit batteries are connected in series to a condition that all unit batteries are arranged to be separated into plural pairs. With this change, the terminal voltage of the electric source apparatus E is changed from 300 V (12 V×25) to 24 V (12 V×2).

SECOND EMBODIMENT

Figure 2:
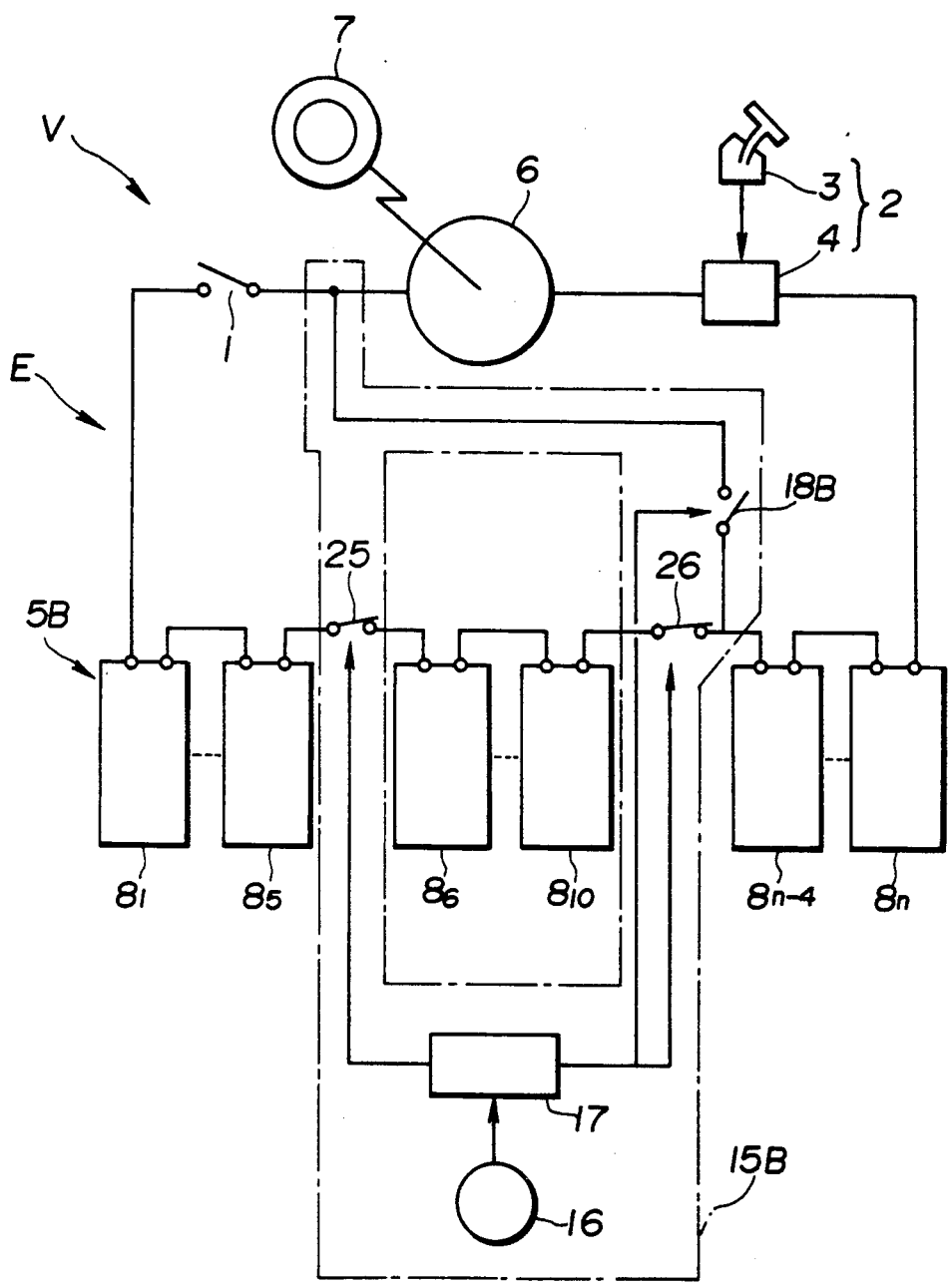
FIG. 2 is a block diagram of a second embodiment of the electric source apparatus in accordance with the present invention.

FIG. 2 shows a second embodiment of an electric source apparatus E of the electric vehicle V in accordance with the present invention.

The electric source apparatus E of this embodiment comprises an electric source 5B for the drive system which source is connected in series with a main switch 1, a drive motor 6 and an acceleration control section 4 of the acceleration device 2. The electric source 5B is constructed by a plurality of battery groups formed by five unit batteries $8_1$ to $8_5$, $8_6$ to $8_{10}$, . . . and $8_{n-4}$ to $8_n$.

A control means 15B includes battery switches 25 and 26 which are disposed between the battery groups, respectively. The first battery group of the unit batteries $8_1$ to $8_5$ is connected in series with the second battery group of the unit batteries $8_6$ to $8_{10}$ through a first battery switch 25. The second group of the unit batteries $8_6$ to $8_{10}$ is connected in series with the third group of unit batteries through a second battery switch 26. With this structure, the electric source 5B can output an electric power of 180 V (60 V×3). The control means further includes an impact sensor 16, a calculating circuit 17, and an in-circuit switch 18B in addition to the battery switches 25 and 26 so as to change the connecting condition between the battery groups in accordance with the impact supplied to the body of the electric vehicle V. The impact sensor 16 attached to a body of the electric vehicle V detects an impact to the vehicle body V and outputs an electric signal indicative of a detected impact value G. The in-circuit switch 18B of a normally open type is operated to connect the battery groups when the detected impact value G is greater than or equal to the preset value Gs.

The manner of operation of the thus arranged electric source apparatus E of the present invention will next be discussed.

When the electric vehicle V is in a parked condition and the the electric source apparatus E is set as shown in FIG. 2, that is, when the electric source apparatus E is in a condition that the main switch 1 is turned off, the in-circuit switch 18B is turned off and the battery switches 25 and 26 are turned off; the low voltage circuit 10 is set in a closed circuit due to the switching of the main switch 1 by the driver so that the electric source 5B of the drive system can supply high voltage electric power to the drive motor 6. In this condition, when the driver operates the acceleration control section 3, the high voltage electric power, which is controlled in accordance with the control input by the driver, is supplied from the drive electric source 5A to the drive motor 6 to drive the drive motor 6. Accordingly, the drive wheels 7 are driven by the drive motor 6, and the electric vehicle V is driven at a speed in accordance with the control input of the acceleration control section 3.

In a driving condition of the electric vehicle V, when the impact, sensor 16 detects an impact such as the impact in a vehicle collision, the calculating circuit 17 compare the detected impact value G with the preset impact value Gs. When the detected impact value G is greater than or equal to the preset value Gs, the calculating circuit 17 stores the signal indicative of the judgement in a memory (not shown) of the calculating circuit 17. The calculating circuit 17 outputs the signal indicative of the stored judgement to the in-circuit switch 18B and the battery switch 25, 26 to place them in a turned off condition. With this turning-off operation of the battery switch 25, 26, the connection between the unit batteries $8_5$ and $8_6$ and between the unit batteries $8_{10}$ and $8_{n-4}$ are cut.

In total, fifteen unit batteries $8_1$ to $8_{15}$ in series connection are changed into a condition that the fifteen unit batteries are separated into battery groups each of which is formed with five unit batteries in series connection. This decreases a terminal voltage of electric source 5B from 180 V to 60 V. Under this separated condition of the unit batteries, the battery group of the unit batteries $8_{n-4}$ to $8_n$ is connected in series with the electric current control section 4, the drive motor 6 and the in-circuit switch 18B to form a low voltage circuit of 60 V. Accordingly, low voltage electric power in accordance with the control amount of the acceleration section 3 is supplied from the battery group of the unit batteries $8_{n-4}$ to $8_n$ to the drive motor 6. The low voltage electric power, which is controlled in accordance with the control input by the driver, is supplied to the drive motor 6 to drive the drive motor 6. The drive wheels 7 are driven by the drive motor 6 so that the electric vehicle V is moved at a low speed from a collision place to a safety place such as a roadside.

While the battery switch 25, 26 is normally switched by the solenoid in accordance with the output signal from the calculating circuit 17, it will be understood that the battery switch 25, 26 may be switched by the link mechanism such as a wire of beam driven by an actuator or that the connection between the unit batteries may be broken by an exploder which operated in accordance with the signal from the calculating circuit 17.

THIRD EMBODIMENT

Figure 3:
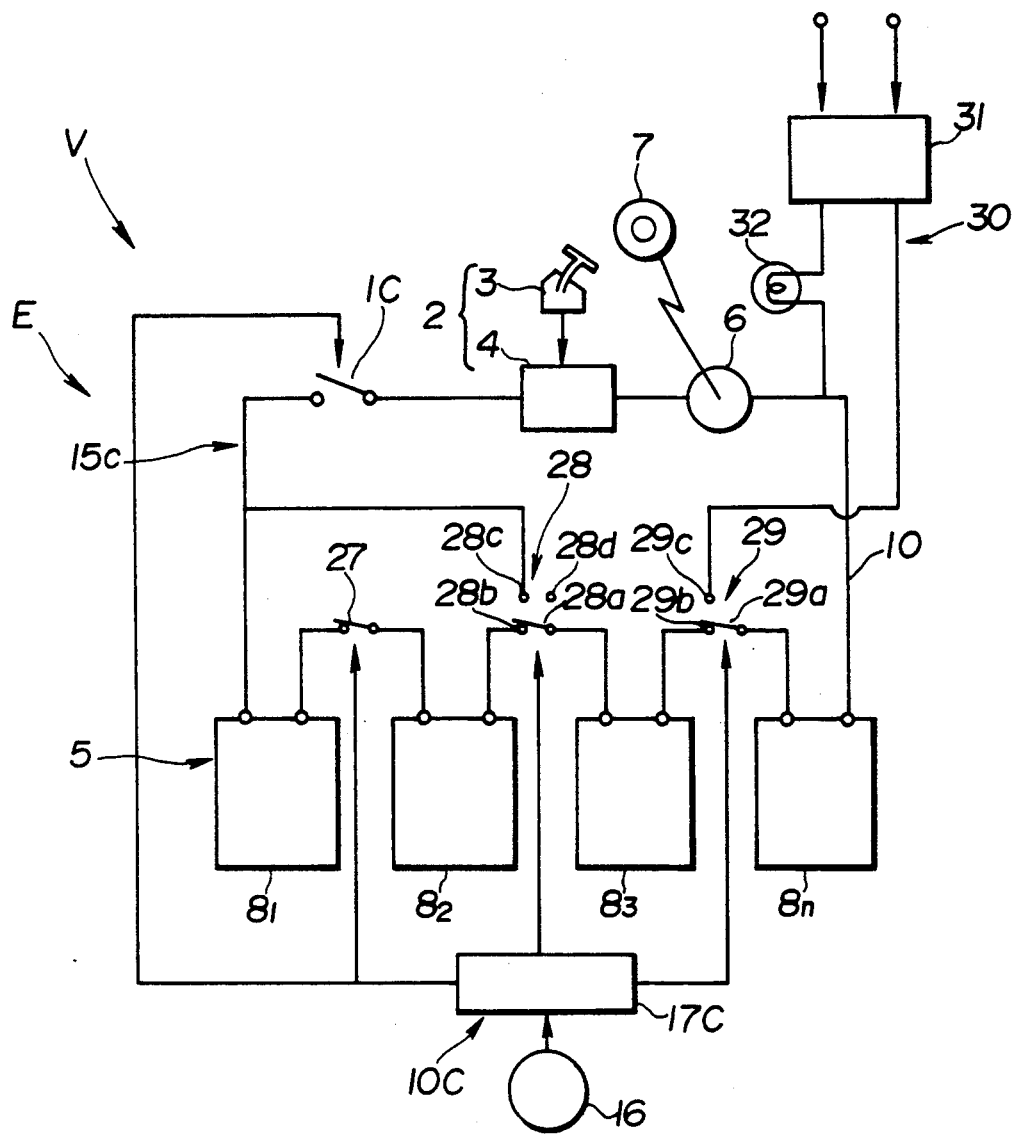
FIG. 3 is a block diagram of a third embodiment of the electric source apparatus in accordance with the present invention.
Figure 4:
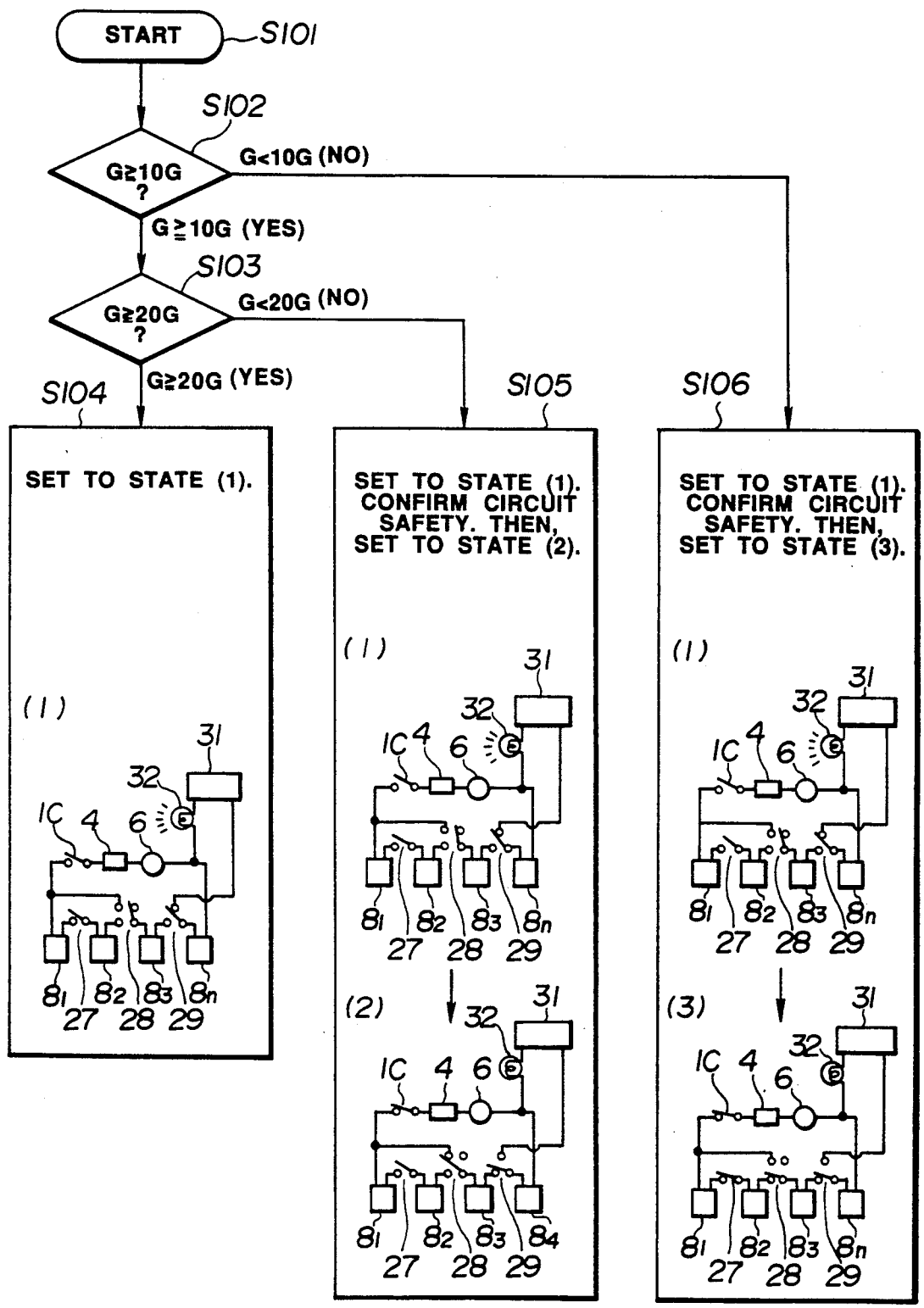
FIG. 4 is a flow chart which explains an operation of the third embodiment of the electric source apparatus when an impact sensor detects an impact.

Referring to FIGS. 3 and 4, there is shown a third embodiment of the electric source apparatus E of the electric vehicle V. The electric source apparatus E of this embodiment comprises an electric source 5C which is formed by unit batteries $8_1$ to $8_n$. The electric source 5C is connected in series with a main switch 1C, an acceleration control section 4 of the acceleration device 2 and a drive motor 6. Battery switches 27, 28 and 29 of a control means 15C are disposed between the unit batteries $8_1$ and $8_2$, between the unit batteries $8_2$ and $8_3$, and between the unit batteries $8_3$ and $8_n$, respectively. The main switch 1C is a normally open type electromagnetic switch and is operated to assume an off state in accordance with a signal indicative of a calculated data outputted from a calculating circuit 17C of the control means 15C, while being manually operated to take one of a turned on state and a turned off state.

The control means 15C includes an impact sensor 16, a calculating circuit 17C and the battery switches 27, 28 and, which function so to change the connection between the unit batteries in accordance with the impact supplied to the vehicle body of the vehicle. The impact sensor 16, which is attached to the vehicle body, detects an impact to the vehicle body and outputs an electric signal indicative of the detected impact value G.

A plurality of predetermined values such as a first value GS1 (10G) and a second value GS2 (20G) are previously preset in the calculating circuit 17C. The preset values have a relationship such that GS1 < GS2. The calculating circuit 17C receives a signal indicative of the detected impact value G from the impact sensor 16 and outputs a signal indicative of calculated data upon comparing the detected impact value G with the first and second impact data GS1 and GS2.

The battery switch 27, which is of a normally closed type electromagnetic switch, connects the unit battery $8_1$ and the unit battery $8_2$ in series. The battery switch 28 includes a movable contact point 28a connected to a terminal of the unit battery $8_3$, a fixed contact point 28b connected to the a terminal of the unit battery $8_2$, a fixed contact point 28c connected to a side of the main switch 1C which is also connected to the unit battery $8_1$, and a fixed contact point 28d which has no connection. In normal operation, the movable contact point 28a is connected with the fixed contact point 28b to serially connect the unit batteries $8_1$ and $8_2$. The movable contact point 28a changes the connecting state so as to be connected with the fixed contact point 28c or the fixed contact point 28d in accordance with the calculated data output by the calculating circuit 17C. The battery switch 29 includes a movable contact point 29a connected to a side of the unit battery $8_n$, a fixed contact point 29b connected to a terminal of the unit battery $8_3$ and a fixed contact point 29c connected to a control section 31 of a monitoring apparatus 30. In a normal condition, the movable contact point 29a is connected with the fixed contact point 29b to connect the unit batteries $8_3$ and $8_n$ in series. The movable contact point 29a changes the connecting state to be connected with the fixed contact point 29c in accordance with the calculated data output by the calculating circuit 17C.

The monitor apparatus 30 is provided with a monitor calculating section 31 and an indicating section 32. Due to the connection between the movable contact point 29a and the fixed contact point 29b, the monitor calculating section 31 receives the calculated data from the calculating circuit 17C, and judges whether or not the electric vehicle V is is an electrically abnormal state such as a fault current and a fire by measuring an electric current, voltage, and ambient temperature of the electric system except for the drive system. Further, when the monitor calculating section 31 judges that the vehicle is in an electrically abnormal state, the monitor calculating section 31 turns on an indicating section 32 while operating a warning means (though not shown) such as a buzzer and a voice generator.

The manner of operation of the thus arranged electric source apparatus E of the present invention will now be discussed.

When the electric vehicle V is in a parked condition and the the electric source apparatus E is set as shown in FIG. 3, that is, when the electric source apparatus E is in a condition that the main switch 1C is turned off, the battery switch 27 is turned on and the movable contact point 28a of the battery switch 28 is connected with the fixed contact point 28a, and the movable contact point 29a of the battery switch 29 is connected with the fixed contact point 29b; the high voltage circuit 10 is set in a closed circuit due to the switching of the main switch 1C by a driver of the vehicle V. With this operation, the electric source apparatus E is arranged so that the high voltage electric power can be supplied from the drive system electric source 5C to the drive motor 6. Under this condition, when the driver operates the acceleration control section 3, the high voltage electric power is supplied from the electric source 5C to the drive motor 6 by the electric current control section 4, in accordance with the control amount of the acceleration control section 3. The drive motor 6 is rotated by the high voltage electric power and the electric vehicle V is driven at a speed in accordance with the control amount of the acceleration control section 3.

The operation of the electric source apparatus E in the event of a vehicle serious collision will be discussed with reference to a flow chart in FIG. 4.

In a step S101, when the impact sensor 16 detects an impact, the program previously programmed in the electric apparatus E proceeds to a step S102.

In the step S102, the calculating circuit 17C judges whether the detected impact value G is smaller than the first preset value Gs1 or not. When the detected impact value G is smaller than the first preset value Gs1 (G<Gs1), a data indicative of G<Gs1 is stored in a memory (through not shown) of the calculating circuit 17C and the program proceeds to a step S106. When the detected impact value G is greater than or equal to the first impact value Gs1 (G≧Gs1), the program proceeds to a step S103.

In the step S103, it is judged whether the detected impact value G is smaller than the second predetermined impact value Gs2 (G<Gs2) or not. When the detected impact value G is smaller than the second predetermined impact value Gs2, (Gs1≦G<Gs2), a data indicative of Gs1≦G<Gs2 is stored in the memory in the calculating circuit 17C and the program proceeds to a step S105. When the detected impact value G is greater than or equal to the second predetermined impact value, Gs2 (G≧Gs2), a data indicative of G≧Gs2 is stored in the memory of the calculating circuit 17C and the program proceeds to a step S104.

In the step S104, the calculating circuit 17C outputs a signal indicative of G≧Gs2 to the battery switches 27, 28 and 29 and the monitor calculating section 31. In accordance with the signal from the calculating circuit 17C, the main switch 1C and the battery switch 27 are put in a turned off condition, the movable contact point 28a of the battery switch 28 is connected with the fixed contact point 28d, and the movable contact point 29a of the battery switch 29 is connected with the fixed contact point 29c. With this operation, the connections between unit batteries $8_l$ to $8_n$ are changed and the indicating section 32 is lighted by the monitor calculating section 31 of the monitor apparatus 30 to inform other drivers that the electric vehicle V is in an abnormal state.

In the step S105, the calculating circuit 17C outputs a signal indicative of Gs1 (10G)≦G<Gs2 (20G) to the battery switches 27, 28 and 29 and the monitor calculating section 31. In accordance with the signal from the calculating circuit 17C, the electric source apparatus E is set to a first state (1) in that the main switch 1C and the battery switch 27 are turned off, the movable contact point 28a of the battery switch 28 is connected with the fixed contact point 28d, and the movable contact point 29a of the battery switch 29 is connected with the fixed contact point 29c. With this operation, the connections between unit batteries $8_l$ to $8_n$ are changed and the indicating section 32 is lighted by the monitor calculating section 31 of the monitor apparatus 30 to inform other drivers that the electric vehicle V is in dangerous state. Simultaneously, it is judged whether or not the electric vehicle V is in an electrically abnormal state such as a fault current and a fire by measuring an electric current, voltage, and ambient temperature of the electric system except for the drive system. When it is judged that the electric vehicle V is not put in an abnormal state, the calculating circuit 17C receives a data indicative that the electric vehicle V is not in the abnormal state. Then, the electric source apparatus E is set to a second state (2) in that the main switch 1C is turned on, the battery switch 27 keeps turned off, the movable contact point 28a of the battery switch 28 is connected with the fixed contact point 28c, and the movable contact point 29a of the battery switch 29 is connected with the fixed contact point 29b. With this operation, the battery switches 28 and 29, the unit batteries $8_3$ and $8_n$, the main switch 1C, the electric current control section 4 and the drive motor 6 form a closed low-voltage circuit. This enables to the electric vehicle V to be driven from an accident point to a safety point nearby the accident point by the electric power of the unit batteries $8_3$ and $8_n$. On the other hand, when the monitor calculating section 31 judges that the electric vehicle V is in an abnormal state, the calculating circuit 17C receives the signal indicative of the dangerous state of the vehicle and keeps the above-mentioned first state (1).

In the step S106, the calculating circuit 17C outputs a signal indicative of G<Gs1 (10G) to the battery switches 27, 28 and 29 and the monitor calculating section 31. In accordance with the signal from the calculating circuit 17C, the electric source apparatus E is set to a first state (1) in that the main switch 1C and the battery switch 27 are put in a turned off condition, the movable contact point 28a of the battery switch 28 is connected with the fixed contact point 28d, and the movable contact point 29a of the battery switch 29 is connected with the fixed contact point 29c. Simultaneously, the indicating section 32 is lighted by the monitor calculating section 31 to inform other drivers that the electric vehicle V is in trouble, and it is judged whether or not the electric vehicle E is in an electrically abnormal state such as a fault current and a fire by measuring an electric current, voltage, and ambient temperature of the electric system except for the drive system. When it is judged that the electric vehicle V is not in the abnormal state, the calculating circuit 17C receives a data indicative that the electric vehicle V is not in the abnormal state. Then, the electric source apparatus E is set to a third state (3) in that the main switch 1C is turned on, the battery switch 27 is turned on, the movable contact point 28a of the battery switch 28 is connected with the fixed contact point 28b, and the movable contact point 29a of the battery switch 29 is connected with the fixed contact point 29b. With this operation, the drive electric source 5C, the main switch 1C, the electric current control section 4 and the drive motor 6 form a closed circuit. Accordingly, the high voltage electric power, which is changes in accordance with the control amount of the acceleration operating section 3, is supplied from the electric source 5C of all unit batteries $8_1$ to $8_n$ to the drive motor 6. This realizes the normal driving of the electric vehicle V. On the other hand, when the monitor calculating section 31 judges that the electric vehicle V is in the abnormal state, the calculating circuit 17C receives the signal indicative of the abnormal state of the electric vehicle V and keeps the above-mentioned first state (1).

FOURTH EMBODIMENT

Figure 5:
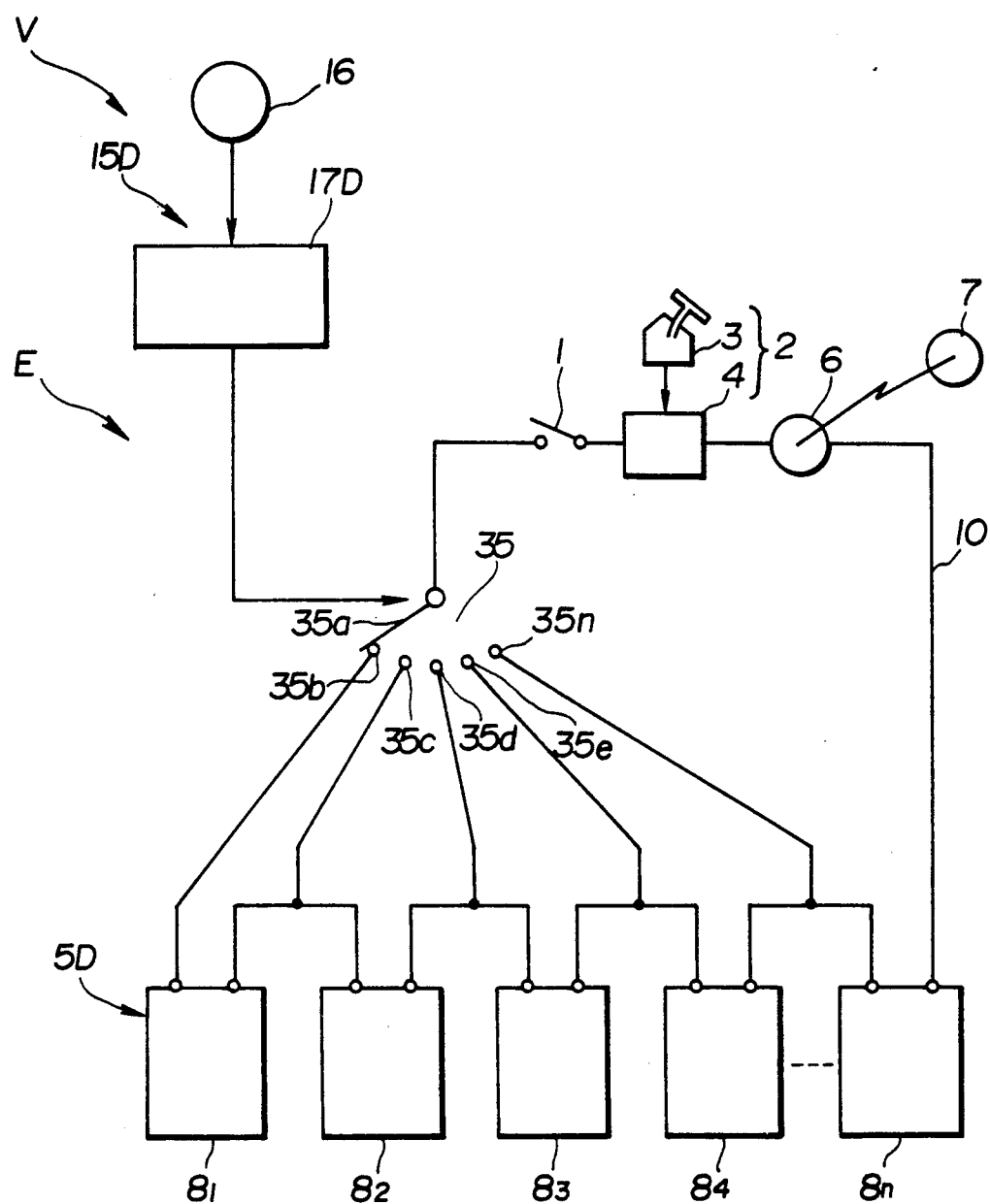
FIG. 5 is a block diagram of a fourth embodiment of the electric source apparatus in accordance with the present invention.

FIG. 5 a fourth embodiment of the electric source apparatus E of the electric vehicle V. The electric source apparatus E comprises a drive electric source 5D, a drive motor 6, an electric current control section 3 of the acceleration device 2, a main switch 1 and an in-circuit switch 35 of a control means 15D connected in series.

The control means 15D includes an impact sensor 16 and a calculating circuit 17D in addition to the in-circuit switch 35 so as to change the connection between the unit batteries in accordance with an impact to the body of the electric vehicle V. The control means 15D is operated by receiving a low voltage which is supplied from one of the unit batteries or the like. The impact sensor 16 attached to the vehicle body detects an impact to the vehicle body and outputs an electric signal in accordance with the detected impact value G.

A plurality of predetermined preset values Gs1, Gs2, ... and Gsn-1, the number of predetermined values being one less than the number of the unit batteries $8_1$, $8_2 \ldots$, and $8_n$, Gsn are preset in the calculating circuit 17D, so that the preset values take greater values with the increase of subscript number of the preset values. The calculating circuit 17D outputs a signal indicative of the calculated result given by comparing the detected impact value G with the predetermined preset values after receiving the detected impact value G from the impact sensor 16.

The in-circuit switch 35 includes a movable contact point 35a which is connected to a side of the main switch which side is connected to the unit battery $8_1$, a fixed contact point 35b which is connected to a terminal of the unit battery $8_1$ which side is of a side of the main switch 1, a fixed contact point 35c which is connected to a terminal connected to the unit batteries $8_1$ and $8_2$, a fixed contact point 35d which is connected to a terminal connected to the unit batteries $8_2$ and $8_3$, a fixed contact point 35e which is connected to a terminal connected to the unit batteries $8_3$ and $8_4$, and a fixed contact point 35n which is connected to a terminal connected to the unit batteries $8_4$ and $8_n$. The movable contact point 35a is normally connected to the fixed contact point 35b so that the series circuit is formed by the drive electric source 5D by the unit batteries $8_1$ to $8_n$, the main switch 1, the electric current control section 4 and the drive motor 6. The in-circuit switch 35 of the electromagnetic type is arranged so as to selectively change a contacting state between the movable contact point 28a and one of the fixed contact points 35c to 35n, in accordance with the calculated result by the calculating circuit 17C.

The manner of operation of the thus arranged electric source apparatus E of the present invention is as follows.

When the electric vehicle V is in a parked condition and the the electric source apparatus E is set as shown in FIG. 5, that is, when the electric source apparatus E is in a condition that the main switch 1C is turned off and the in-circuit switch 35 is put in a state to connect the movable contact point 35a and the fixed contact point 35b; the high voltage circuit 10 is set in a closed circuit in response to the switching of the main switch 1C by the driver. With this operation, the electric source apparatus E is set so that the high voltage electric power can be supplied from the drive system electric source 5C to the drive motor 6.

Under this condition, when the driver operates the acceleration control section 3, the high voltage electric power is supplied from the electric source 5C to the drive motor 6 by to the electric current control section 4, in accordance with the acceleration control section 3. The drive motor 6 is driven by the high voltage electric power and the vehicle V is driven at a speed in accordance with the acceleration control section 3.

In a vehicle drive condition, when the impact sensor 16 detects an, such as an impact of a vehicle collision, the calculating circuit 17D compares the detected impact value G which is sent from the impact sensor 16 with the predetermined impact values Gs1 to Gsn. As a result of the comparison by the calculating circuit 17D, when the detected impact value G is greater than or equal to the first predetermined impact value Gs1, a judgement indicative of G>Gs1 is stored in a memory (though not shown) of the calculating circuit 17. Then, the in-circuit switch 35 takes a state in which the movable contact point 35a is connected to the fixed contact point 35c. With this connection, the unit battery $8_1$ assumes a separated state and the drive electric source 5D is formed by the unit batteries $8_2$ to $8_n$.

When the detected impact value G is greater than or equal to the second predetermined impact value Gs2, a judgement indicative of G>Gs2 is stored in the memory (not shown) of the calculating circuit 17. Then, the in-circuit switch 35 takes a state in which the movable contact point 35a is connected to the fixed contact point 35d. With this connection, the unit batteries $8_1$ and $8_2$ assume a separated state and the drive electric source 5D is formed by the unit batteries $8_3$ to $8_n$.

When the detected impact value G is greater than or equal to the third predetermined impact value Gs3, a judgement indicative of G>Gs3 is stored in the memory (though not shown) of the calculating circuit 17. Then, the in-circuit switch 35 is set in a state that the movable contact point 35a is connected to the fixed contact point 35e. With this connection, the unit batteries $8_1$ to $8_3$ assume a separated state and the drive electric source 5D is formed by the unit batteries $8_4$ to $8_n$.

When the detected impact value G is greater than or equal to the N-1 predetermined impact value Gsn-1, a judgement indicative of G>Gsn-1 is stored in the memory (though not shown) of the calculating circuit 17. Then, the in-circuit switch 35 is set in a state in which the movable contact point 35a is connected to the fixed contact point 35n. With this connection, the unit batteries $8_1$ to $8_{n-1}$ assume a separated state and the drive electric source 5D is formed by the unit battery $8_n$.

While the fourth embodiment of the present invention has been shown and described as being formed with the unit batteries $8_1$ to $8_n$ in series connection and controlling the voltages of the electric source, it will be understood that the unit batteries in parallel connection may be used as a drive electric source, and that the drive electric source may be arranged to be controlled in its output electric current.

What is claimed is:

1. An electric source apparatus of an electric vehicle, comprising:
   a plurality of unit batteries:
   means for connecting one from among said unit batteries with another from among said unit batteries;
   means for detecting an impact which is applied to a body of the electric vehicle and for outputting a signal in accordance with said detected impact; and
   control means for changing a state of said connecting means from a connected state to an unconnected state in accordance with the signal from said impact detecting means.

2. An electric source apparatus as claimed in claim 1, wherein said control means includes an a calculating means which compares the signal from said impact detecting means with a predetermined preset value, and at least one battery switch which is disposed between said unit batteries.

3. An electric source apparatus as claimed in claim 2, wherein said battery switch is turned off so as to change the connection of said unit batteries from an integrally connecting state to a state separated into a plural groups when the calculating means judges that the impact value is greater than or equal to the predetermined preset value.

4. An electric source apparatus as claimed in claim 1, further comprising a drive motor with which the electric vehicle is driven, said drive motor receiving an electric power from said unit batteries.

5. An electric source apparatus as claimed in claim 1, wherein said control means includes a plurality of battery switches which are disposed at a corresponding plurality of connecting portions between said unit batteries, and a calculating means which compares the signal from said impact detecting means with a plurality of predetermined preset values.

6. An electric source apparatus as claimed in claim 5, wherein said control apparatus changes the connecting states of said unit batteries into one of a plurality of predetermined states in accordance with the signal from said impact detecting means which is compared with the predetermined preset values.

7. An electric source apparatus as claimed in claim 1, further comprising a monitor device which indicates that the electric vehicle is in an electrically abnormal state.

8. An electric source apparatus as claimed in claim 1, wherein said control means includes an impact sensor which detects the impact applied to the body of the electric vehicle and outputs a signal indicative of the impact value, calculating means which compares the impact value with a first preset value and a second present value greater than the first preset value, at least one battery switch which is disposed between said unit batteries, and a monitor device which indicates that the electric vehicle is in an electrically abnormal state.

9. An electric source apparatus as claimed in claim 8, further comprising a drive motor with which the electric vehicle is driven, the drive motor receiving an electric power from said unit batteries.

10. An electric source apparatus as claimed in claim 9, wherein when the signal from said impact detecting means is greater than or equal to the second preset value the monitor device is operated; when the signal from said impact detecting means is greater than or equal to the first preset value and is smaller than the second preset value the monitor device is operated and the drive motor is connected with a part of the unit batteries; and when the signal from said impact detecting means is smaller than the first preset value the monitor device is operated and the drive motor is connected with all the unit batteries.

11. An electric source apparatus of an electric vehicle, comprising:
 a plurality of unit batteries;
 a changeable interconnection means for interconnecting said batteries into a predetermined plurality of connection states, said changeable interconnection means including at least one battery switch connecting at least one from among said unit batteries with at least one other from among said unit batteries;
 an impact sensor detecting an impact applied to the body of the electric vehicle and outputting a signal indicative of a value of the impact;
 control means for changing the connection of said unit batteries in accordance with the signal from said impact sensor, said control means including calculating means which compares the impact value with a predetermined preset value and outputs a signal in accordance with said comparison; and
 means for turning said battery switch off so as to change the connection of said unit batteries from an integrally connecting state to a state wherein said unit batteries are separated into plural groups when the signal output from said calculating means indicates that the impact value is greater than or equal to the predetermined preset value.

12. An electric source apparatus of an electric vehicle, comprising:
 a plurality of unit batteries,
 an impact sensor which detects an impact applied to the body of the electric vehicle and outputs a signal indicative of a value of the impact; and
 control means for selectively connecting said unit batteries to one another into a selected one of a plurality of predetermined interconnection states in accordance with the signal from said impact sensor, said control means including a plurality of battery switches, each of which is disposed at one of a corresponding plurality of connecting portions between said unit batteries, and including a calculating means for comparing the impact value with a plurality of predetermined preset values, wherein said control means performs the selective connection based on the comparison.

13. An electric source apparatus as claimed in claim 11, wherein said control means changes the connecting state of said unit batteries into one of the predetermined plurality states in accordance with the impact value which is compared with the predetermined preset values.

14. An electric source apparatus of an electric vehicle, comprising:
 a plurality of unit batteries having a changeable interconnection;
 a drive motor for driving the electric vehicle in response to an electric power from said unit batteries;
 an impact sensor detecting an impact applied to the body of the electric vehicle and outputting a value indicative of a magnitude of the impact; and
 control means for changing the interconnection of said unit batteries with one another and with said drive motor in accordance with the signal from said impact sensor, said control means including a calculating means for comparing the impact value with a first preset value and with a second preset value which is greater than the first preset value, and including at least one battery switch which is disposed between said unit batteries, and including a monitor device for indicating when the electric vehicle is in an electrically abnormal state, and wherein
 when the impact value is greater than or equal to the second preset value, the monitor device is operated, and
 when the impact value is greater than or equal to the first preset value and is smaller than the second preset value, the monitor device is operated and the drive motor is connected with a subset of unit batteries from among said plurality of unit batteries, and
 when the impact value is smaller than the first preset value the monitor device is operated and the drive motor is connected with all said plurality of unit batteries.

* * * * *